US008633961B2

(12) United States Patent
Jung et al.

(10) Patent No.: US 8,633,961 B2
(45) Date of Patent: Jan. 21, 2014

(54) MOBILE TERMINAL AND METHOD OF PROVIDING VIDEO CALLS USING THE SAME

(75) Inventors: Kwang Mo Jung, Gyeonggi-do (KR); Sung Hee Hong, Seoul (KR); Byoung Ha Park, Seoul (KR); Young Choong Park, Seoul (KR); Kwang Soon Choi, Gyeonggi-do (KR); Yang Keun Ahn, Seoul (KR); Hoonjong Kang, Gyeonggi-do (KR)

(73) Assignee: Korean Electronics Technology Institute, Seongnam-Si (KR)

( * ) Notice: Subject to any disclaimer, the term of this patent is extended or adjusted under 35 U.S.C. 154(b) by 229 days.

(21) Appl. No.: 13/307,828

(22) Filed: Nov. 30, 2011

(65) Prior Publication Data

US 2012/0140019 A1 Jun. 7, 2012

(30) Foreign Application Priority Data

Dec. 2, 2010 (KR) .......................... 10-2010-0122097

(51) Int. Cl.
*H04N 7/14* (2006.01)
(52) U.S. Cl.
CPC ...................................... *H04N 7/14* (2013.01)
USPC .................. 348/14.02; 348/14.01; 348/14.12
(58) Field of Classification Search
USPC .............................. 348/14.01–14.16; 382/100
See application file for complete search history.

(56) References Cited

U.S. PATENT DOCUMENTS

2008/0259154 A1* 10/2008 Garrison et al. ............ 348/14.01
2009/0207269 A1*  8/2009 Yoda ........................... 348/222.1

FOREIGN PATENT DOCUMENTS

KR     1020060078468 A     7/2006
KR     1020090062440 A     6/2009

OTHER PUBLICATIONS

Korean Office Action, Communication mailed Feb. 16, 2012 in corresponding Korean Patent Application No. 10-2010-0122097.

* cited by examiner

*Primary Examiner* — Melur Ramakrishnaiah
(74) *Attorney, Agent, or Firm* — Sughrue Mion, PLLC

(57) ABSTRACT

A mobile terminal and a method of providing a video call using the same are disclosed. More particularly, a mobile terminal capable of supporting a video call while ensuring user's privacy by mounting a three-dimensional depth camera and a two-dimensional camera in the mobile terminal and a method of providing a video call using the same are disclosed. The mobile terminal of the present invention includes a 2D camera 200 capturing a 2D video and a 3D depth camera 210 capturing a 3D depth video; an individual image separation module 112 extracting boundary information between a user and a background by using depth information regarding a video captured by the 3D depth camera 210; a composite video generation module 114 separating the user video from the video captured by the 2D camera 200 by using the extracted boundary information and composing the separated user video and the set background video.

7 Claims, 1 Drawing Sheet

MOBILE TERMINAL AND METHOD OF PROVIDING VIDEO CALLS USING THE SAME

RELATED APPLICATIONS

This application claims priority to Korean Patent Application No. 10-2010-0122097, filed on Dec. 2, 2010, entitled, "Mobile Terminal And Method Of Providing Video Call Using Same", which is incorporated herein by reference in its entirety.

BACKGROUND OF THE INVENTION

1. Field of the Invention

The present invention relates to a mobile terminal and a method of providing a video call using the same, and more particularly, to a mobile terminal capable of supporting a video call while ensuring user's privacy by mounting a three-dimensional depth camera and a two-dimensional camera in the mobile terminal and a method of providing a video call using the same.

2. Description of the Related Art

Owing to ceaseless study and technological development, a terminal, in particular, a mobile terminal has provided various convenience functions for users, such as a digital camera, an alarm function, a short message service, a multimedia message service, E-mail, infrared communication, and all including a simple telephone function for providing audio calls. In addition, the above-mentioned convenience functions for a user have been increasingly diversified with the demand of a user and the development of technology.

That is, due to the sudden development of communication technology, the function of a mobile terminal performing only an audio call between a user and a third party has been gradually expanded and as a result, the mobile terminal is provided with more various user interface functions. According to this tendency, communication means capable of performing audio, video, and data transfer has been developed and a method of providing high-speed multimedia services has been ceaselessly researched.

As one of functions recently provided for user convenience, there is a video call function that performs a call while seeing each other, rather than performing a call using only audio. The video call is performed by simultaneously transmitting an audio data input through a microphone, or the like, and a video data input through a camera, or the like. The video call uses real-time video streaming technology to transmit the video data to a third party, thereby performing a call while seeing each other. In addition, with the spread of a third generation service, the number of users using the video call has been gradually increased.

In the case of the video call, the audio call may be performed while seeing each other. In this case, an output of the audio data according to the audio call is higher than an output of the audio data according to a general audio call. For example, the mobile terminal is switched to a speaker phone mode at the time of the video call to provide the audio data.

Therefore, the audio data of the third party is provided at high output through a speaker, which causes inconvenience to a user at a place where the audio call is inconvenient. For example, the audio data output by the speaker phone mode is output to a user and others around the user, such that it is difficult to ensure privacy of conversation contents. That is, the conversation contents with the other party are made aware to others around the user, such that it is difficult to protect the user's privacy.

In addition, the video call according to the related art transfers the user and backgrounds around the user to the third party. Therefore, the user's privacy and the privacy of others may be invaded. That is, the video call according to the related art may invade an individual's privacy at any time.

SUMMARY OF THE INVENTION

Accordingly, it is an object of the present invention to provide a mobile terminal ensuring user's privacy at the time of performing a video call function among various functions of the mobile terminal and ensuring privacy capable of realistically observing a third party's appearance by applying a 3D technology, and a method of providing a video call using the same.

Another object of the present invention is to provide a mobile terminal ensuring privacy while effectively using a chroma key effect and a peripheral noise removal function when the mobile terminal broadcasts a video and a method of providing a video call using the same.

According to an exemplary embodiment of the present invention, there is provided a mobile terminal, including: a 2D camera capturing a 2D video and a 3D depth camera capturing a 3D depth video; an individual image separation module extracting boundary information between a user and a background by using depth information regarding a video captured by the 3D depth camera; and a composite video generation module separating the user video from the video captured by the 2D camera by using the extracted boundary information and composing the separated user video and the set background video.

According to another exemplary embodiment of the present invention, there is provided a method of providing a video call, including: acquiring 2D video and 3D depth information from a 2D camera capturing the 2D video and a 3D depth camera capturing a 3D depth video; extracting boundary information between a user and a background by using depth information regarding a video captured by the 3D depth camera; and separating the user video from the video captured by the 2D camera by using the extracted boundary information and composing the separated user video and the set background video.

As set forth above, the mobile terminal according to the exemplary embodiment of the present invention can ensure the user's privacy at the time of performing the video call function among various functions and ensure the privacy while realistically depicting the third party's appearance by applying the 3D technology. The exemplary embodiment of the present invention can effectively ensure privacy using a chroma key effect and a peripheral noise removal function when the mobile terminal broadcasts a video.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The foregoing and additional aspects of the exemplary embodiment of the present invention will be more apparent through exemplary embodiments of the present invention described with reference to the accompanying drawings. Hereinafter, the exemplary embodiments of the present invention will be described in detail so as to be easily understood and reproduced by a person skilled in the art to which the present invention pertains.

A mobile terminal and a method of providing a video call ensuring privacy according to an exemplary embodiment of the present invention can transmit only user's voice by separating video and audio data while a third party doesn't see peripheral backgrounds other than a user's appearance during a video call, thereby ensuring individual privacy. Like a chroma key, other images that a user wants to get may be inserted into the background and a stereoscopic appearance of a third party may be seen using a 3D display.

The user's appearance is separated from the background using videos captured by a 2D camera and a 3D depth camera and the stereoscopic 3D video is generated using a measured depth value.

The video of the user separated in the above-mentioned manner may be immediately transmitted to the third party without background or may be seen by the third party as if the user performs a video call at another location by composing the video of the user with a new background image like the chroma key.

Figure 1:
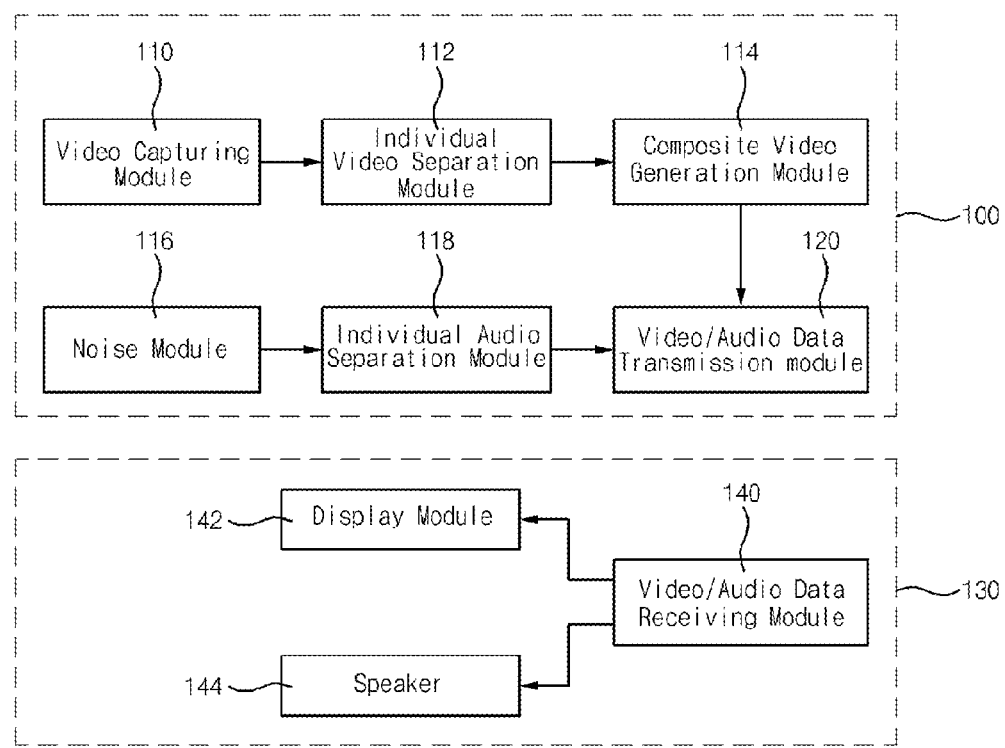
FIG. 1 is a block diagram showing a mobile terminal ensuring privacy according to an exemplary embodiment of the present invention.

FIG. 1 is a block diagram showing a mobile terminal ensuring privacy according to an exemplary embodiment of the present invention. Hereinafter, the mobile terminal ensuring privacy according to the exemplary embodiment of the present invention will be described in detail with reference to FIG. 1.

Referring to FIG. 1, the mobile terminal is divided into a video call transmitting unit 110 and a video call receiving unit 130. The video call transmitting unit 110 includes a video capturing module 110, a sound collection module 116, an individual video separation module 112, a composite video generation module 114, an individual audio detection module 118, and a video and audio data transmission module 102. The video call receiving unit 130 includes a video and audio data receiving module 140, a display module 142, and a speaker 144. In addition, it is apparent that other components other than the above-mentioned components may be included in the mobile terminal.

The video capturing module 110 includes the 2D camera and the 3D depth camera. A multi-view video and depth information regarding a scene are needed in order to generate the three-dimensional video. A method of acquiring the depth information may be divided into a passive type and an active type. The passive type identifies the depth information of the scene using the captured image, which may correspond to a stereo matching method or a method of converting a two-dimensional video into a three-dimensional video. The active type is a hardware-based type using a distance sensor and uses equipment, such as a depth camera, a three-dimensional scanner, and so on, using a time of flight (TOF) sensor. The depth camera using the TOF sensor may obtain the actual depth information regarding the scene in real time.

Hereinafter, an operation of the three-dimensional camera will be described below. The three-dimensional camera displays objects located near a camera by a white color and objects located far away from a camera by a black color. Therefore, it may be recognized that a video displayed by a white color in the three-dimensional video is a video of object located near the camera and a video displayed by a black color is a video of object located far away from the camera.

The three-dimensional camera configures a front part of a camera and includes an infrared pulse outputting unit and an infrared pulse receiving unit. The infrared pulse outputting unit outputs the infrared pulse to the front part of the camera and the infrared pulse receiving unit receives infrared pulses reflected and returned from objects among the infrared pulses output from the infrared pulse outputting unit. The three-dimensional camera measures the time when the output infrared pulse is reflected and returned from objects. The three-dimensional camera measures a distance to objects using the measured time. The objects located at a distance far away from the camera are displayed as black by using the calculated distance information and the objects located at a distance near the camera are displayed as white. The images captured by the 2D camera and the 3D depth camera are the same at all times, such that spatio-temporal synchronization needs to be performed. To this end, the 2D camera and the 3D depth camera may be located in a space adjacent to each other.

The individual video separation module 112 separates the user's video from the peripheral background in the video captured using the 3D depth camera. Generally, the user is located nearest the camera. Therefore, when only the user's appearance is recognized by limiting a recognition range of the 3D depth camera, only the user's appearance may be separated while disregarding the peripheral background. As described above, the 3D depth camera displays objects located at a near distance by a white color and objects located at the remote by a black color. Therefore, the individual video separation module 112 separates the video displayed by a white color from the captured video. In addition, the separation of the video displayed by a white color uses a predetermined threshold.

The composite video generation module 114 composes the depth information of the 3D depth camera with the images of the 2D camera to generate the composite video. Only the user video is acquired from the 2D video by using the boundary information between the user and the background that are acquired from the 3D depth camera. To this end, as described above, the 3D depth camera and the 2D camera need to have the same spatio-temporal synchronization. The acquired user video is composed with the stored background video, such that the composite video generation module 114 acquires the user video composed with the user desired background video rather than acquiring the existing captured background.

The composite video generated from the composite video generation module 114 is transmitted to the video or audio data transmission module.

The sound collection module 116 generally includes a microphone that collects a user's voice and sound around the user. The audio or sound collected in the sound collection module 116 is transmitted to the individual audio detection module 118.

The individual audio detection module 118 detects only the predetermined user's voice from the sound information in which several noises are mixed, which is input through the sound collection module 116. When the user's voice is previously recorded, a frequency band of voice is calculated and stored. Thereafter, at the time of the video call, only the user's voice is detected by separating the voice in the corresponding frequency band from the sound information that is input through the microphone. The audio data detected in the individual audio detection module 118 are transmitted to the video and audio data transmission module 120.

The video and audio data transmission module 120 transmits the video and audio data to the third party by using a video call API of a smart phone. The video and audio data are synchronized and transmitted.

The video and audio data receiving module 140 transmits the received video and audio data of the third party to the display module 142 and the speaker 144, respectively. In this case, it is confirmed whether the received video and audio data are synchronized with time and then, each data is transmitted to the display module 142 and the speaker 144.

The display module 142 outputs the received video data of the third party to a screen. The speaker 144 outputs the received audio data of the third party.

Further, in the exemplary embodiment of the present invention, the display module may be configured with the 3D stereoscopic video display module. The 3D stereoscopic video display module implements a table type 3D display function and a flash hologram display function. A free visual table type 3D display is a free visual table type 3D display rather than a general display hung on a wall. That is, the stereoscopic video may be provided to the user by displaying a virtual 3D object horizontally existing on the table like actually existing on the table.

Figure 2:
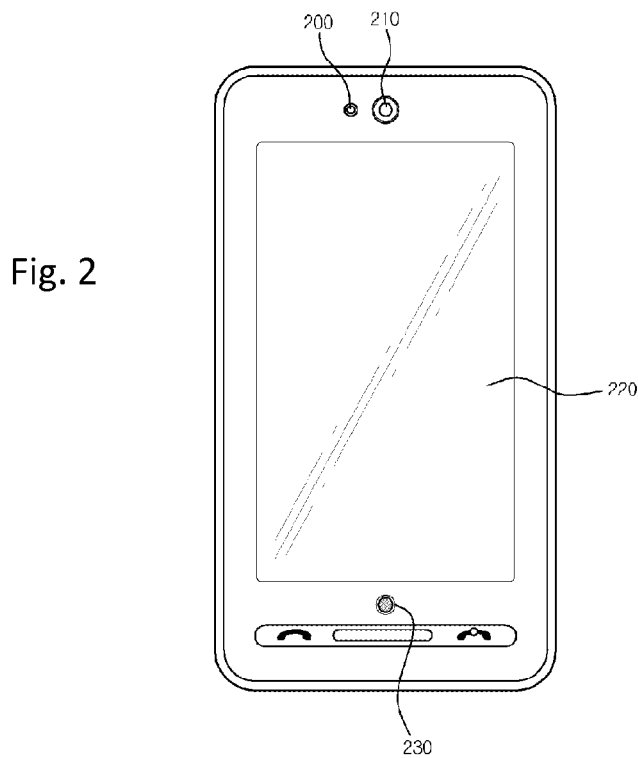
FIG. 2 is a front view showing the front part of the mobile terminal ensuring privacy according to the exemplary embodiment of the present invention.

FIG. 2 is a front view showing the front part of the mobile terminal ensuring privacy according to the exemplary embodiment of the present invention. Hereinafter, a structure of the mobile terminal ensuring privacy according to the exemplary embodiment of the present invention will be described in detail with reference to FIG. 2.

As shown in FIG. 2, the mobile terminal includes a 2D camera 200, a 3D depth camera 210, a display 220, and a microphone 230. In addition, it is apparent that other components other than the above-mentioned components may be included in the mobile terminal.

The 2D camera 200 captures a video including the user video and the background video so as to perform the video call. The 3D depth camera 210 also captures the video including the user video and the background video so as to perform the video call, like the 2D camera 200. As described above, the 2D camera 200 and the 3D depth camera 210 need to be spatio-temporal synchronized so as to capture the same video. The boundary information between the user video and the background video are extracted using the depth information regarding the video captured by the camera 210. The user video is separated from the video captured by the 2D camera 200 using the extracted boundary information.

The microphone 230 receives the user's voice and audio including noises at the area adjacent to the user. The received audio separates the user's voice from noises by using the frequency information of the pre-stored user's voice.

The display 220 may be implemented by a liquid crystal display (hereinafter, referred to as 'LCD'), wherein the LCD may be implemented by a touch screen type. When the LCD is implemented by the touch screen type, the LCD may be operated as an input unit.

In addition to the above-mentioned configuration, the mobile terminal may configure the input unit. The input unit receives various character information and transmits key signals input regarding the setting of various functions and a function control of the mobile terminal to the control module. The input unit may be implemented by any one of a touch pad, a key pad of a general key arrangement, and a keypad in a qwerty type, or a combination thereof. The mobile terminal may further include function keys, such as a directional key set to perform the specific functions, a volume key, and a hot key, or the like.

In addition, although exemplary embodiments of the present invention have been illustrated and described, the present invention is not limited to the above-mentioned embodiments and various modified embodiments can be made by those skilled in the art within the scope of the appended claims of the present invention. In addition, these modified embodiments should not be seen as separate from the technical spirit or prospects outlined herein.

What is claimed is:

1. A mobile terminal, comprising:
    a 2D camera capturing a 2D video and a 3D depth camera capturing a 3D depth video;
    an individual image separation module extracting boundary information between a user and a background by using depth information regarding a video captured by the 3D depth camera; and
    a composite video generation module separating the user video from the video captured by the 2D camera by using the extracted boundary information and composing the separated user video and the set background video.

2. The mobile terminal of claim 1, wherein the video captured by the 2D camera and the video captured by the 3D depth camera are synchronized temporally or spatially.

3. The mobile terminal of claim 1, further comprising an individual audio detection module separating a user's voice from sound information provided from a microphone by using a frequency component for the user voice.

4. The mobile terminal of claim 3, further comprising a video and audio transmission module transmitting the video composed in the composite video generation module and the audio separated from the individual audio separation module.

5. A method of providing a video call, comprising:
    acquiring 2D video and 3D depth information from a 2D camera capturing the 2D video and a 3D depth camera capturing a 3D depth video;
    extracting boundary information between a user and a background by using depth information regarding a video captured by the 3D depth camera; and
    separating the user video from the video captured by the 2D camera by using the extracted boundary information and composing the separated user video and the set background video.

6. The method of claim 5, wherein the video captured by the 2D camera and the video captured by the 3D depth camera are synchronized temporally and spatially.

7. The method of claim 6, further comprising transmitting the composed video to external devices, wherein the transmitting to the external devices includes separating a user's voice from sound information voice provided from a microphone by using a frequency component for the user's voice and transmitting the separated user's voice.

* * * * *